Sept. 29, 1970  E. D. JONES ET AL  3,531,359
APPARATUS FOR HEAT-SEALING OF PLASTIC MATERIALS
Filed March 27, 1967  3 Sheets-Sheet 1

INVENTORS
Elwyn David JONES
David James PARKER

PATENT AGENT

INVENTORS
Elwyn David JONES
David James PARKER

PATENT AGENT

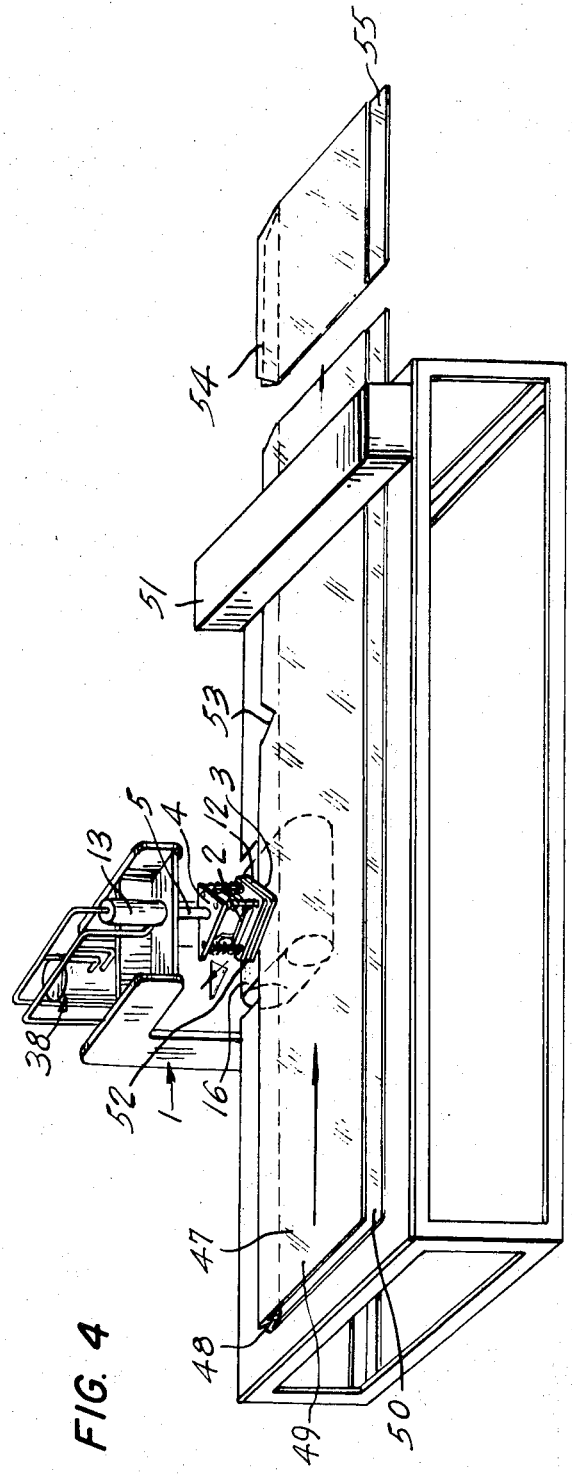

United States Patent Office 3,531,359
Patented Sept. 29, 1970

3,531,359
APPARATUS FOR HEAT-SEALING OF PLASTIC MATERIALS
Elwyn David Jones, Beloeil, Quebec, and David James Parker, Otterburn Park, Quebec, Canada, assignors to Canadian Industries Limited, Montreal, Quebec, Canada, a corporation of Canada
Filed Mar. 27, 1967, Ser. No. 626,296
Int. Cl. B32b 31/08, 31/20
U.S. Cl. 156—515                    10 Claims

ABSTRACT OF THE DISCLOSURE

A hot blade sealer for concurrent heat-sealing and cutting of superimposed layers of plastic film having a movable resilient heat-resistant film support which is moved after each sealing operation so that the position of contact of the sealer blade with the film support is continually being changed. The use of a movable resilient film support avoids fouling of the support by melted plastic during continuous operation of the sealer.

---

This invention relates to an apparatus for heat sealing plastic materials.

During the manufacture of plastic containers such as bags, it is necessary to cut and seal plastic film. The strength of the resulting article is dependent to a large degree upon the strength of the seals made during fabrication. To be satisfactory such seals must melt together the layers of plastic to be sealed without at the same time appreciably lowering the strength of the film adjacent to the seal. It is known to cut the plastic film adjacent to the region to be sealed and then compress the layers of film between an anvil and a hot sealer bar, thus melting and sealing the film. This method suffers from the disadvantage that the heat for sealing must pass through the film before reaching the inner surfaces to be sealed, and there may result over-heating of the film adjacent to the seal resulting in a weakened seal. It is also known to employ a hot blade sealer wherein the blade cuts through the film layers to be sealed and at the same time seals the cut edges. Although this method of sealing has the advantage of applying heat directly to the seal region of the film, in practice there is experienced difficulty in avoiding fouling of the film support by residual melted plastic from the cut film.

It has now been discovered that layers of heat-sealable plastic film can be concurrently heat-sealed and severed using a hot blade sealing means without fouling the film support with melted plastic if the layers of film to be sealed and severed are compressed momentarily between the heated blade sealing member and a movable resilient support, the blade being withdrawn immediately with concurrent movement of the support to provide a changed, and therefore cooler, film support surface. The sealed portions of film are then separated. It has been discovered that this type of sealing device can be used continuously without fouling of the film support with melted plastic.

It is therefore a primary object of the invention to provide a means for making heat-seals between layers of heat-sealable plastic film by use of a hot blade sealer wherein the fouling of the film support by melted plastic is avoided. Additional objects will appear hereinafter.

The film sealing apparatus of this invention comprises a heat sealing and cutting blade having its film contacting surface shaped in the configuration of the seal desired, a movable resilient heat resistant film support cooperating with said blade, said blade being adapted to momentarily compress layers of film between its film contacting surface and the stationary film support, thus sealing the film and concurrently severing the film at the sealed position, the blade being withdrawn from contact with the film support after severing the film, and concurrent with the withdrawal of the blade the resilient film support being moved to change the position of contact of the film support with the blade edge. Preferably the movement of the film support acts in cooperation with a film holding means to separate the two pieces of cut and severed film.

An embodiment of the invention is illustrated in the accompanying drawings wherein:

FIG. 4 is a diagrammatic view of the device of FIGS. 1 to 3 in use, in conjunction with a known transverse sealing and cutting unit, in the fabrication of block bottom plastic bags.

Figure 1:
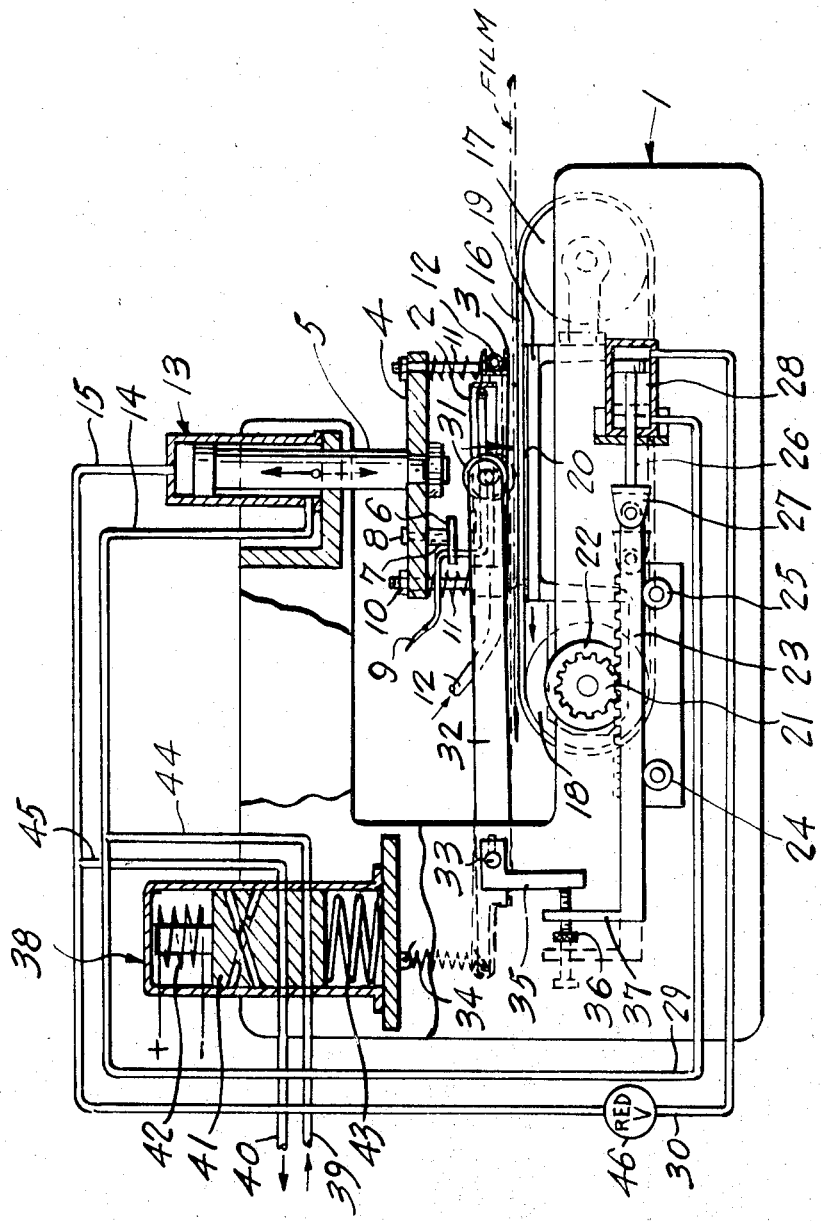
FIG. 1 is a side elevation, partly in section, of the heat sealing device.
Figure 2:
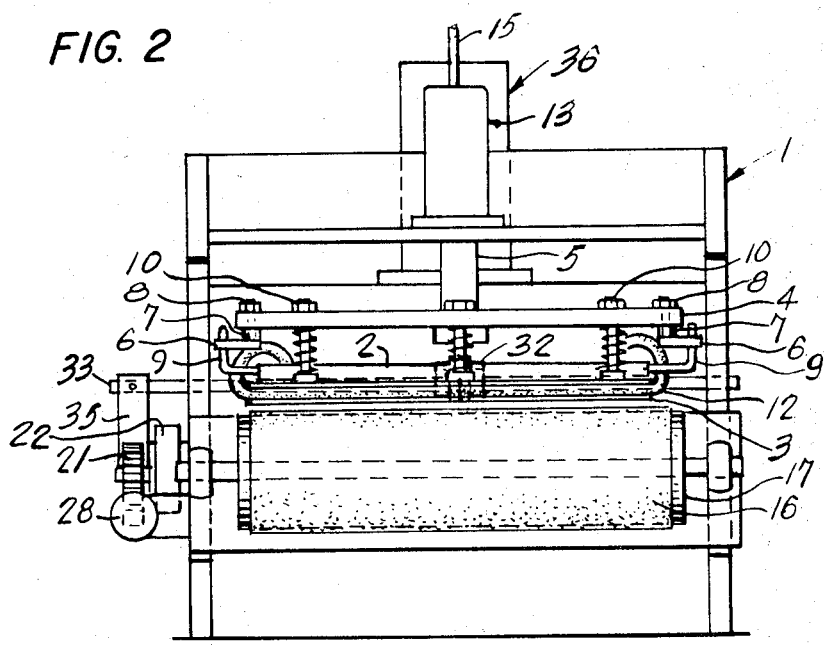
FIG. 2 is a front elevation of the device of FIG. 1.
Figure 3:
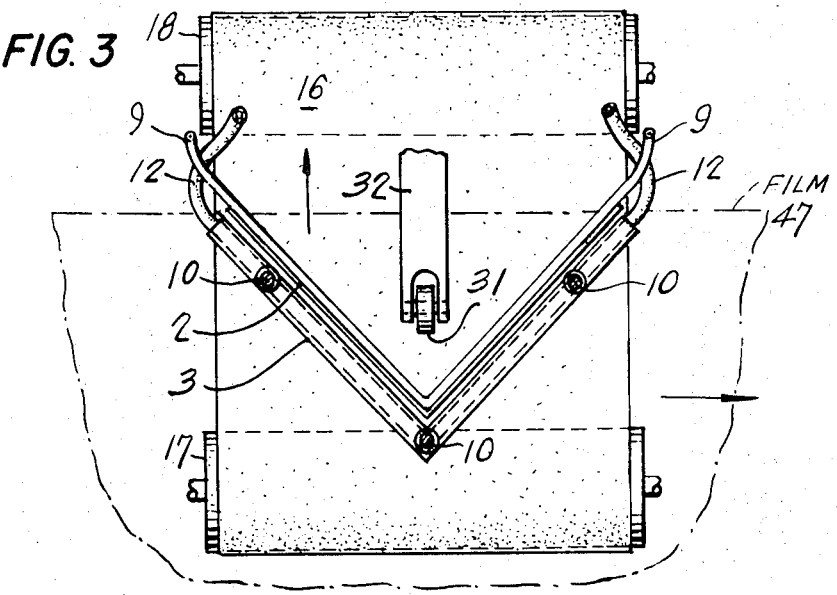
FIG. 3 is a plan view of the heat sealing member, the cooling member, and the film holding roller of FIG. 1.

Referring now to FIGS. 1 to 3 the frame of a sealing device is shown generally at 1. The upper projection of the frame carries a blade sealer assembly comprising a V-shaped, electrically heated blade sealer 2, a V-shaped water cooled film clamp 3, both attached to support plate 4, which in turn is attached to actuating piston 5. Each end of the V-shaped blade sealer 2 is attached rigidly to support plate 4 by means of bracket 6, spacer 7 and screw 8. The electrical connections to the blade sealer are indicated at 9. Water cooled film clamp 3 is attached resiliently to support plate 4 by means of movable bolts 10 which are maintained in position by helical springs 11. A clamp cooling water tube is shown at 12. The film clamp is fastened to the support plate by three bolts. Air cylinder 13, connected to compressed air lines 14 and 15, is adapted to lower or raise the sealing assembly.

The film support comprises resilient heat resistant belt 16 which is carried by rolls 17 and 18 and passes over anvil 19 which is faced with a resilient heat resistant pad 20. Means for moving belt 16 comprises pinion 21 attached to roll 18 through a unidirectional clutch 22, and a rack 23 engaging pinion 21. Rack 23 is maintained in mesh with pinion 21 by rollers 24 and 25. The right extremity of rack 23 is linked to piston 26 by means of clevis 27. Piston 26 is actuated by air cylinder 28, connected to compressed air lines 29 and 30, which is adapted to displace rack 23 to the right or to the left. When rack 23 moves to the right, the clutch 22 on roll 18 is engaged and belt 16 moves to the left. However, when rack 23 moves in the reverse direction the clutch disconnects pinion 21 from roll 18 so that belt 16 remains stationary.

At 31 is shown a film holding roller mounted at the extremity of arm 32 which pivots on shaft 33. Spring 34 attached to the other extremity of arm 32 acts to press roller 31 against film lying on belt 16. Attached to the end of shaft 33 is arm 35 which is adapted to engage screw 36 carried in bracket 37 affixed to rack 23. The relative positions of arm 35 and screw 36 are such that when belt 16 reaches the extreme limit of each movement, roller 31 is lifted off the belt.

A four-way solenoid air valve is shown generally at 38. A source of compressed air is connected to air inlet 39. The valve exhaust is shown at 40. The valve is adapted, by changing the position of valve spool 41 controlled by solenoid 42 and recuperating spring 43, to connect either the compressed air line or the exhaust to air lines 44 and 45. Line 44 is connected to both line 14 actuating cylinder 13 and line 29 actuating cylinder 28. Line 45 is connected to both line 15 actuating cylinder 13 and line 30, actuating cylinder 28. In line 30 is restrictor valve 46 which permits free flow of air to cylinder 28 but restricts the exhaust flow of air in the reverse sense.

During operation of the sealing device, the cycle of sealing and cutting the superimposed plies of film begins with the film lying on belt 16 in register with blade sealer 2 (heated electrically to a temperature of 600° F. to 1000° F.) which is in a raised position, rack 23 being at its extreme position to the right holding roller 31 clear of the film. Solenoid 42 is energized electrically so that the valve is in the lower position where compressed air is supplied to line 45 (which is connected to lines 15 and 30). As a result the sealer assembly is forced against the film plies to be sealed. Concurrently rack 23 is driven to the left, lowering roller 31 onto the film surface adjacent to the seal area, belt 16 remaining stationary due to clutch 22 being disengaged. Cooled film clamp 3 contacts the film surface first, and under the force of compressed springs 11, clamps the film against belt 16. As the sealer assembly is lowered further, heated blade sealer 2 passes through the film, cutting and sealing the cut edges of superimposed plies of film until it rests against belt 16. Belt 16 and anvil pad 20 form a resilient cushion for the sealer blade so that the blade passes completely through the plastic film leaving two severed sections of film sealed along their cut edges. Solenoid 42 then is disconnected from the source of electric power so that spring 43 forces valve spool 41 upwards connecting line 45 to exhaust and supplying compressed air to line 44. This raises the sealer assembly through air supplied to air line 14. As the sealer assembly rises, the sealer blade 2 moves up first, followed by film clamp 3 as springs 11 become extended. Concurrently air is admitted to line 29 forcing rack 23 to the right and advancing the top of belt 16 to the left. Due to the restricting action of valve 46 line 30 does not exhaust as quickly as line 15 so that blade 2 has retracted clear of the film before belt 16 begins to move. Since roller 31 is holding the piece of severed film in close contact with belt 16, the motion of the belt serves to eject the severed film to the left. As rack 23 reaches the end of its travel (the position shown in FIG. 1), roller 31 is raised and the film being processed is moved to the position of the next seal to be formed. The sealing cycle is then repeated.

In FIG. 4 is illustrated the use of the sealing device of this invention, in conjunction with a known transverse sealing and cutting unit, in the manufacture of block bottom plastic bags. The starting material is heat-sealable plastic film 47 folded longitudinally with a gussetted fold at 48. The folded film has two facing panels 49 and 50 of unequal width. The bag making machine employed has standard means for advancing the film in units equivalent to one bag width and for sealing the film panels transversely with adjacent double seals and cutting transversely between said two seals to sever lengths of double panel film terminated with transverse seals. This known equipment is indicated generally at 51. The sealing device of the present invention is shown at 52 placed at exactly two bag widths distant from transverse sealing and cutting unit 51. The distance separating 51 and 52 could, of course, be any integral number of bag widths. The actuating mechanisms of 51 and 52 are coordinated so that while 52 is forming the diagonal bottom seals of two consecutive bags, unit 51 is forming the transverse seals and transverse severing cut of two consecutive bags in which the diagonal bottom seals have already been formed. Sealing device 52 normally would seal together the four plies of film of the gusset fold but it has been found that the printing ink employed on the outer surface of film used in commercial bag manufacture is sufficient to prevent sealing between the two inner plies of the gusset. The sealing device 52 seals and simultaneously severs a triangular gusset seal and then ejects the severed triangular piece of scrap. A formed triangular seal is shown at 53 one bag width from the transverse sealing unit which at the next cycle will form two transverse seals joining the apex of triangular seal 53 and sever the sealed film between these two transverse seals. A completed bag is shown at 51 having been ejected from unit 51 at the completion of the transverse sealing and cutting. This bag has a bottom formed of a gusset fold and a top provided with a closing flap 55 formed by the extremity of the wider panel of the starting length of two-ply film.

The blade of the sealer can be made of suitable heat resistant material such as stainless steel or aluminium. The contour of the edge of the blade will be chosen to suit the seal and cut desired. It may be square ended or with an inclined surface.

The belt which serves as heat resistant movable film support may be fabricated from glass cloth or from polytetrafluoroethylene ("Teflon") or a combination of these. The anvil pad underlying the top of the belt may conveniently be polytetrafluoroethylene or silicone rubber.

The film holding means (roller 31) is constructed of material that when heated does not adhere to plastic film. A heat resistant material such as polytetrafluoroethylene is suitable.

It has been found that air pistons 13 and 28 can be readily incorporated into the programmed control system of known bag making machines so that they are actuated in coordination with other air-actuated elements of the machine. However, it is also feasible to provide all electric, or mechanical actuation of the sealing device, the latter drawing power from, say, a chain carried by the parent machine.

Although the cause of the freedom from fouling of the apparatus of the invention by melted plastic is not known with certainty, it is believed that the provision of a constantly changing (and therefore cool) film support is at least partially responsible.

The sealing device of this invention has been found very effective in continuous service in the sealing of 1 to 3 mil polyethylene film to form block bottom open ended bags.

What we claim is:

1. In an apparatus for the concurrent heat-sealing and severing of superimposed layers of plastic film wherein a movable heated blade compresses layers of film between its blade edge and a film support thus concurrently sealing said layers of film and severing the sealed film at the seal position, the improvement comprising a movable resilient heat-resistant flat film support which is stationary during the sealing operation, a heated blade movable in a direction perpendicular to the flat film support, said blade having an edge shaped in the configuration of the seal and being adapted to contact its edge with the film support only when the support is stationary, and means for changing, by movement of the film support after each sealing operation, the position of contact of said film support with said blade edge.

2. An apparatus as claimed in claim 1 wherein said film support is an endless belt.

3. An apparatus as claimed in claim 1 wherein said film support is an endless belt resting at its position of contact with said blade edge on a pad of heat-resistant resilient material.

4. An apparatus as claimed in claim 1 wherein during the sealing operation the layers of film are clamped between the film support and a removable clamping means.

5. An apparatus as claimed in claim 1 wherein during the sealing operation the layers of film are clamped between the film support and a continuously cooled and removable clamping means.

6. An apparatus as claimed in claim 1 wherein after the completion of the sealing operation the changing of position of the film support is adapted to separate the severed pieces of sealed film.

7. An apparatus as claimed in claim 1 wherein after completion of the sealing operation the changing of position of the film support cooperates with a removable film holding means to separate the severed pieces of sealed film.

8. An apparatus as claimed in claim 1 wherein the means for changing the position of contact of the film support with the blade edge acts in coordination with the means for moving the blade.

9. An apparatus as claimed in claim 4 wherein the means for removing the removable clamping means from the film surface acts in coordination with the means for changing the position of contact of the film support with the blade edge.

10. An apparatus as claimed in claim 7 wherein the means for removing the removable film holding means from the film surface acts in coordination with the means for changing the position of contact of the film support with the blade edge.

References Cited

UNITED STATES PATENTS

| | | | |
|---|---|---|---|
| 3,191,356 | 6/1965 | Zelnick et al. | 53—182 |
| 3,334,004 | 8/1967 | Faust et al. | 156—515 X |
| 3,451,870 | 6/1969 | Pearson | 156—515 X |

FOREIGN PATENTS 608,482  9/1960  Italy.

BENJAMIN A. BORCHELT, Primary Examiner

J. M. HANLEY, Assistant Examiner

U.S. Cl. X.R.

156—251, 380